March 24, 1942.  J. L. ANDERSON  2,277,473
METHOD AND APPARATUS FOR MAKING WELDED TUBES
Filed Nov. 6, 1937  2 Sheets-Sheet 1
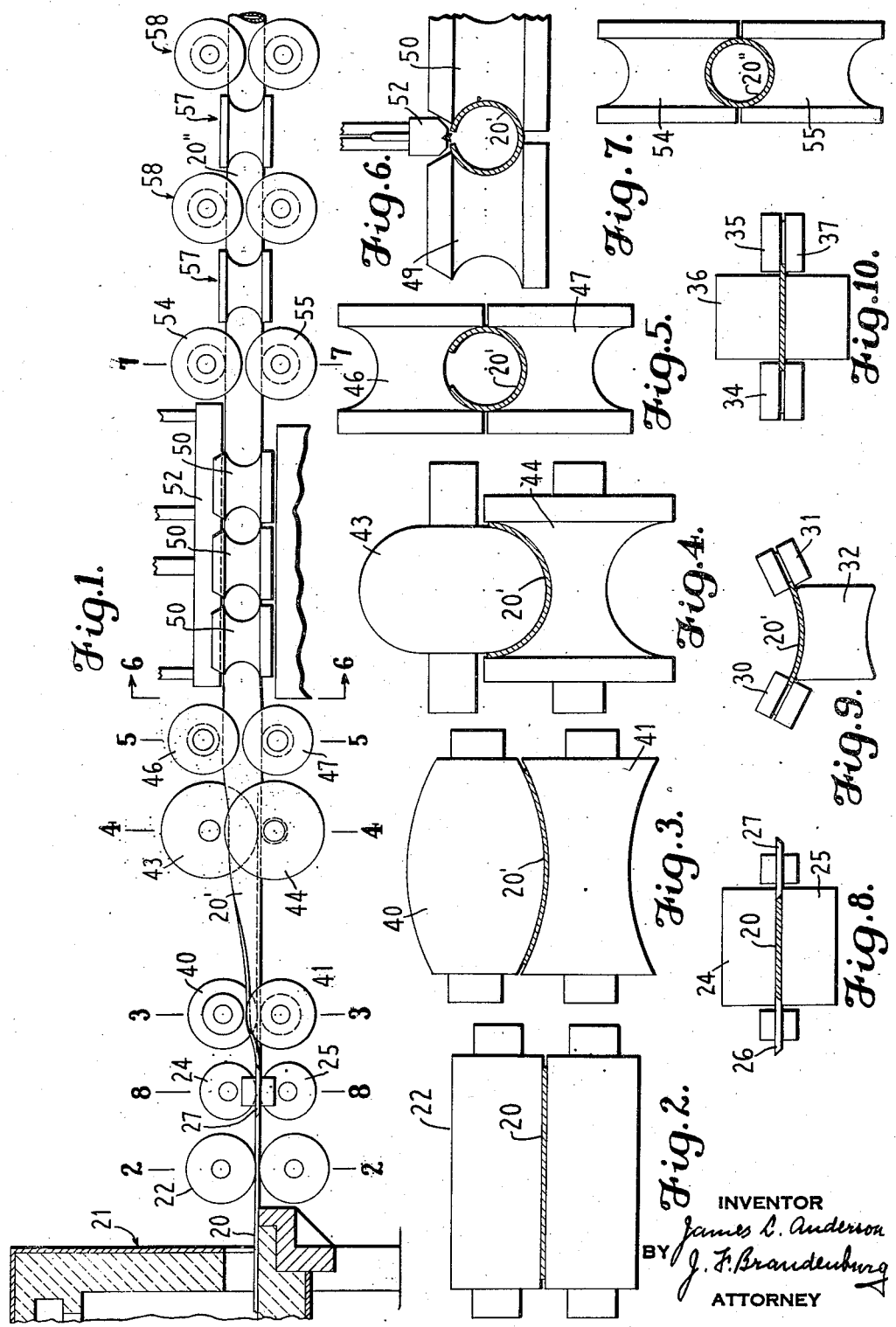

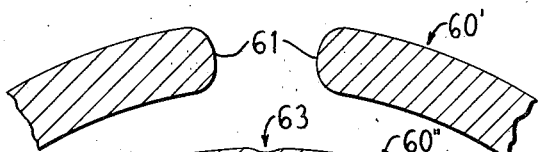
Fig. 11.
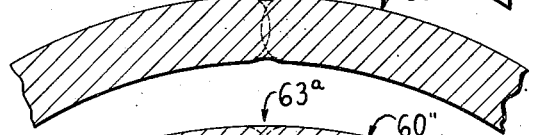
Fig. 12.
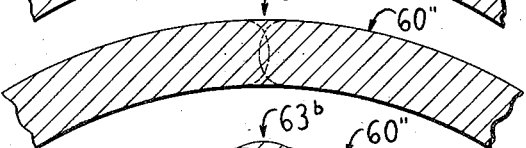
Fig. 13.
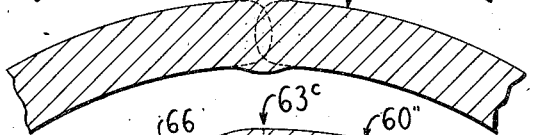
Fig. 14.
PRIOR ART
Fig. 15.
Fig. 16.
Fig. 17.
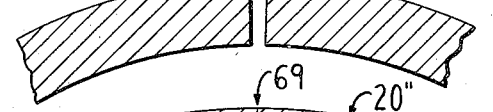
Fig. 18.
Fig. 19.
Fig. 20.
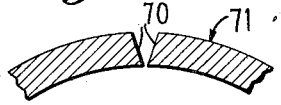
Fig. 21.
Fig. 22.
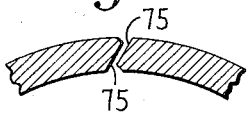
Fig. 23.
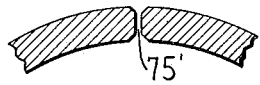

Patented Mar. 24, 1942

2,277,473

UNITED STATES PATENT OFFICE 2,277,473

METHOD OF MAKING WELDED TUBES

James L. Anderson, Closter, N. J., assignor to Air Reduction Company, Incorporated, New York, N. Y., a corporation of New York Application November 6, 1937, Serial No. 173,153

8 Claims. (Cl. 78—94)

This invention is an improved method of making welded tubes by moving heated skelp through forming and closing apparatus which bends the skelp to tubular form and brings the heated edges together to make a weld.

It is an object of this invention to provide an improved method of making longitudinal seam welded tubes, and to make such tubes from ordinary commercial skelp without variation in the weld contour. The weld contour is controlled by hot rolling the commercial skelp, after preheating in preparation for welding, to a uniform width and edge contour while the skelp travels from the preheating to the final heating and welding step.

Another object is to provide an improved method of controlling the pressure with which the edge faces of a heated skelp come together to produce welded tubes of substantially uniform wall thickness around the circumference of the tube.

Ordinary hot-rolled skelp made without reference to tube production has convex edge faces which are the result of the rolling process by which the skelp is manufactured, and such skelp usually varies in width at different points along its length. For tube welding operations requiring uniform skelp width and edge faces of special shape, or in particular relation to one another, it has been the practice of tube manufacturers to buy special skelp which has been rolled to their specifications of width and edge form, but where a number of different edge shapes and slightly varying widths of the special skelp are needed, a separate stock is required for each shape.

With this invention, inexpensive commercial skelp is made uniform in width and the edges are shaped as a continuous operation with the forming and welding of the tube. Where skelp is preheated in a furnace, or otherwise, before the edges are exposed to the heating agencies that raise them to a welding condition, the edging of the skelp is performed between the preheating and welding steps so that the initial heating of the skelp serves the double purpose of supplying heat for the shaping of the edges and giving the tube blank a high enough temperature so that comparatively little additional heating is required. The skelp edges can be given any desired shape by using different rolls for shaping the edges.

The invention also permits control of the pressure with which the edge faces of the skelp are brought together in a manner which obtains perfectly formed tubes of uniform wall thickness along the seam.

Other objects, features and advantages of the invention will appear or be pointed out as the specification proceeds.

In the accompanying drawings, forming part hereof:

Fig. 1 is a diagrammatic side elevation of tube welding equipment for carrying out the invention;

Figs. 2–7 are enlarged sectional views along the lines 2—2 to 7—7, respectively, of Fig. 1, with the rolls shown in elevation;

Fig. 8 is a sectional view on the line 8—8 of Fig. 1, with the rolls shown in elevation;

Fig. 9 is a modified form of the apparatus shown in Fig. 8;

Fig. 10 is another modified form of the apparatus shown in Fig. 8;

Figs. 11–17 are fragmentary sectional views illustrating the welding of tubes in accordance with the prior art;

Figs. 18 and 19 illustrate one kind of weld made in accordance with this invention; and Figs. 20–23 show other forms of skelp edges which may be made by this invention and the manner in which the edges are brought together.

Skelp 20 is heated in a furnace 21 to a temperature substantially below that of fusion and even below the fusing temperature of the oxides on the surface of the skelp. After the desired amount of preheating, the skelp is pushed out of the furnace into the bite of feed rolls 22, which advance the skelp into other roll stands where it is edged, formed, and welded. The skelp used with this invention may be in separate pieces no longer than the furnace, or may be supplied to the furnace as a continuous strip. The partially-formed tube is indicated by the reference character 20' and the welded tube by 20''.

The skelp 20 is ordinary commercial skelp which has a convex contour to its edge faces as a result of the rolling process by which it is manufactured. Such skelp also varies in width within a limited range.

Just beyond the feed rolls 22 the skelp 20 goes into an edging roll stand comprising horizontal rolls 24 and 25 above and below the skelp (Figs. 1 and 8), and other rolls 26, 27 turning on vertical axes and extending between the rolls 24, 25. The rolls 26, 27 are equal to the skelp in thickness and they are shaped so as to form with the horizontal rolls 24, 25 a pass having the width and the edge contour which is desired for the skelp.

The invention is not limited to the edge rolling shown in Figs. 1 and 8. A modified edge-rolling structure is shown in Fig. 9. Side rolls 30 and 31 have grooves into which the edges of the skelp 20' extend during its initial forming, and these edge rolls press the skelp against a concave roll 32. The arch contour of the skelp 20' makes it possible for the rolls 30 and 31 to crown the edges with sufficient force to shape them and to reduce the skelp to uniform width without causing it to buckle. Still another modified form of edging pass is shown in Fig. 10, where the edges of the skelp 20 are shaped by grooved rolls 34, 35 similar to the rolls 30, 31 but acting on the skelp while flat and while it is held against buckling by horizontal rolls 36, 37 which are preferably power driven and slightly narrower than the skelp so that they leave the edge portions of the skelp exposed.

While this invention may be used in preparing edges for abutment as parallel planes, it is not limited to any particular shape of edge. For different welding operations, different relations of the edges are best suited. The preferred embodiment only will be described in detail, but it will be understood that whatever relation of edges is desired the contour necessary can be made in the edging roll stand having the corresponding shape on the rolls 26, 27 or in the grooves of rolls 30, 31 or 34, 35.

Beyond the edging pass the skelp 20' travels through a first forming pass comprising a convex upper roll 40 and a concave lower roll 41, and then through a second forming pass comprising convex and concave rolls 43 and 44, respectively, having shorter radii of curvature than the preceding rolls.

A third forming pass is made up of rolls 46, 47 which bend the skelp 20' to generally tubular form, but with the edge faces widely spaced. All of the forming and welding rolls are preferably power driven in a manner well understood in the art, and together with the welding rolls comprise a complete forming mill.

After passing between the rolls 46, 47, the partially-formed skelp or tube blank 20' passes through one or more roll passes comprising rolls 49, 50 (Figs. 1 and 6) which hold the edges in a definite spaced relation as they travel under a torch 52. The torch projects a row of flame jets directly against the right edge face and another row of flame jets against the left edge face of the skelp. These flame jets are of high intensity and raise the surface metal of the edge faces to a welding condition quickly and uniformly while the edges are traveling at high speed. The flame jets are preferably oxyacetylene flames, but oxygen blasts or other heating agencies can be employed.

The speed of travel of the skelp and the rate at which the edge faces are heated by the torch 52 are so correlated that the edge faces are heated to a welding condition as they near the end of the torch. Immediately beyond the torch 52 the tube blank 20' passes between welding rolls 54 and 55 which complete the forming of the tube by bringing the edges together to make a weld. If the edge faces have been heated to a condition of oxide free surface fusion, it is not necessary that they be brought together with any appreciable pressure, mere touching of the surfaces being enough to make the weld.

The tube making apparatus shown in Fig. 1 includes, beyond the welding rolls, sizing and straightening roll stands 57, 58, from which issues the finished tube. All roll stands may be power driven, but the driving mechanism is omitted from the drawing for greater clearness.

Some of the advantages of the invention can best be explained by reference to Figs. 11-23.

Fig. 11 shows the seam edges of a tube blank 60' made with ordinary skelp. The edge faces 61 are convex and the skelp is not of uniform width. When the welding rolls which close the tube are adjusted for the average width of the skelp, narrow places in the skelp cause the welded tube 60'' (Fig. 12) to have a depressed weld 63, which is not as thick or as strong as the wall of the tube.

The dotted lines in Figs. 12-14 indicate the original contour of the skelp edges, and from these illustrations it is evident how much the edges must be deformed to make the welds shown. Fig. 13 shows a "flush" weld $63^a$ which is obtained at regions where the skelp is of average width. This portion of the weld is equal to the tube wall in thickness, but if the metal squeezed out from between the abutting edges is largely oxide the pockets of such metal at the top and bottom of the weld make the section of unaffected pure metal thinner and weaker than the tube wall. Wider portions of the skelp cause the thickened weld $63^b$ of Fig. 14.

If the seam edges are not heated enough to fuse or soften the metal for a substantial distance back of the edge faces along portions of the skelp that are wider than the average, the tube may bend in to form a cave 66 at one side of the weld $63^c$, as shown in Fig. 15; or the cave may occur at the weld $63^d$, as shown in Fig. 16; or the excess metal may cause the metal to be upset along the weld $63^e$ in Fig. 17 and at the same time form a cave 67 along the side of the weld.

Fig. 18 shows one manner in which the seam edges may be brought together when making welds with this invention. The edge faces 68 of the tube blank 20' come together as substantially parallel planes and form a weld 69 (Fig. 19) without requiring any distortion of the edge metal. There being no variations in the width of the skelp which is formed into the tube blank 20', the weld 69 is of constant thickness throughout its length in contrast to the different sections 63, $63^a$ and $63^b$ at different regions along the length of the welded seam of the tube 60'' shown in Figs. 12-14, and the tube 20'' is perfectly formed with no caves or upsets such as shown in Figs. 15-17.

When the edge faces meet as parallel planes, as shown in Fig. 18, and no softening of the metal behind the edges is required, only the surface metal of the edge faces need be heated and the welding can be done with the tube blank traveling at such high speed and the heating agencies so intense that the surface of the edge faces is heated to a welding condition before the metal below the surface is softened by conduction of heat through the metal. Such rapid heating not only obtains high speed but reduces the amount of heat required for a given length of weld.

Instead of bringing the edge faces together as parallel planes in the manner illustrated in Figs. 18 and 19, specifications may call for a tube having an inside flash but no outside flash, or viceversa. In such cases the edge faces may be brought together as shown in Figs. 20 and 21. In Fig. 20 edge faces 70 of a tube blank 71 are closer together at their inner edges so that they form an outwardly opening V. In Fig. 21 edge faces 72 of a tube blank 73 are in such angular relation that they form an inwardly opening V. When a "puddle" weld is desired on a top seam, a V trough, such as shown in Fig. 20, may be utilized.

The invention is not limited to any particular shape of edge. Fig. 22 shows another edge form in which oblique faces 75 are shaped and in such angular relation that they come together as parallel planes over part of their surfaces and as V troughs at the upper and lower edges of the seam cleft and by controlled pressure produce a full sectioned weld. Fig. 23 shows a modification of the edge form of Fig. 22, with parallel faces 15' extending radially instead of obliquely.

The positions of the rolls may be reversed so that when desirable the longitudinal seam cleft may be located at the bottom rather than on the top of the pipe length. Other changes and modifications can be made in the illustrated embodiments of the invention, and some features may be used without others.

I claim:

1. In the manufacture of welded tubes by heating the entire body of the skelp in a furnace and pulling the skelp from the furnace through forming and closing apparatus which bends the skelp into a tube and brings the edges together to make a weld, the improvement which comprises performing only a limited preheating in the furnace and then raising the edges of the skelp to a welding condition by heating agencies applied locally to the edges along a substantial length of said edges after the skelp comes from the furnace and insuring uniform welding pressure by progressively reducing the skelp to uniform width and desired edge contouring during the travel of the skelp from the furnace to the region of local edge heating.

2. The method of making welded tubes comprising progressively bending preheated skelp to tubular form and bringing the edges together to make a weld, and correlating flame heating of the edges with the speed of progression so that the edge faces are heated to a welding condition, but with no substantial depth of the edge faces fused, when they come together and causing the edges to exert a substantially uniform pressure against one another, at all points along their length as said edges are brought together to make the weld, by progressively rolling the skelp to a uniform width by edge pressure applied prior to the welding and after the preheating and as a continuous process with the forming and welding.

3. In a tube welding process in which skelp from a preheating furnace is formed, welded and sized in one continuous operation, the improvement which comprises rolling the furnace-heated skelp as a continuous operation with the forming, welding and sizing, performing said rolling progressively while the skelp moves between the furnace and the welding region, and by said rolling reducing the skelp to a substantially uniform width with edge faces in such relation to each other that they constitute substantially parallel planes when they come together for the welding step, supplying the welding heat to the edges of the skelp locally by projecting intense heating flames directly against the edge faces prior to the completion of the forming step, and so correlating the heating of the edge faces with their speed of travel that said edge faces are raised to a welding condition but no substantial quantity of metal is melted by the time the edges come together to make the weld.

4. The method of making flush welds of tube seams with skelp having oxide on its surface, which method comprises preheating the skelp in a furnace across the full width of the said skelp, progressively forming the skelp into a tube and bringing the edge faces into contact, reducing the skelp to a uniform width and shaping the edges progressively at some region of the travel of the skelp between the zone of preheating and the point at which the edge faces come into contact, so shaping the edge faces that they come together as substantially parallel planes, and heating the edges locally by projecting intense heating agencies directly against the edge faces to raise them to a welding condition quickly and with no substantial melting of metal below the surface of the edge faces.

5. The method of making a longitudinal seam welded tube of substantially uniform wall thickness around the circumference of the tube, which method comprises preheating the skelp in a furnace to a temperature less than that required for welding, then rolling the hot skelp to reduce it to a uniform width and uniform thickness across its entire width with the edge faces in such relation that they will meet as parallel planes when the skelp is formed and the edge faces are brought together to make a weld, then forming the rolled skelp into a hot tube and locally heating the edge faces to bring said faces to a welding condition during the forming operation, and bringing the edge faces together with a contact pressure that avoids radial displacement of the metal.

6. In the manufacture of skelp into flame-welded longitudinal seam tubing of substantially uniform weld thickness throughout its length, the improvement which comprises controlling the pressure with which fused edge faces of the seam are brought into contact by preheating the skelp for welding and thereafter hot rolling the skelp to a uniform width as a continuous process with the forming and welding operation.

7. The method of making welded tubes from previously manufactured skelp of non-uniform width or improper edge contour, which method comprises preheating the skelp in a furnace, then hot rolling the skelp by edge pressure that is applied to the skelp from opposite sides and by said rolling reducing the skelp to a uniform width and shaping the edges to the desired contour, and as a continuous and progressive operation with the hot rolling step, applying heating jets to the edges to heat said edges locally to a welding condition, forming the skelp, and bringing the edges together to make the weld.

8. The method of making welded tubes by pulling skelp of non-uniform width from a furnace at a temperature less than that required for welding, reducing the hot skelp to a uniform width and shaping the edge faces, to a desired contour by rolling pressure applied against the edge faces and in a direction at an angle to the transverse surface of the skelp, said rolling pressure being applied to the skelp progressively along its length as it comes from the furnace, maintaining the thickness of the hot skelp uniform across its entire width and holding it against transverse buckling by rolling pressure applied to a transverse surface of the skelp at the region of the edge rolling, progressively forming the skelp into a tube blank with converging, but spaced, edge faces as the skelp travels beyond the region of edge rolling, locally heating the edge faces of the tube blank by projecting heating agencies directly against the separated edge faces of the tube blank as it moves beyond the region of forming, and progressively bringing the edge faces together immediately after the region of local heating.

JAMES L. ANDERSON.